UNITED STATES PATENT OFFICE.

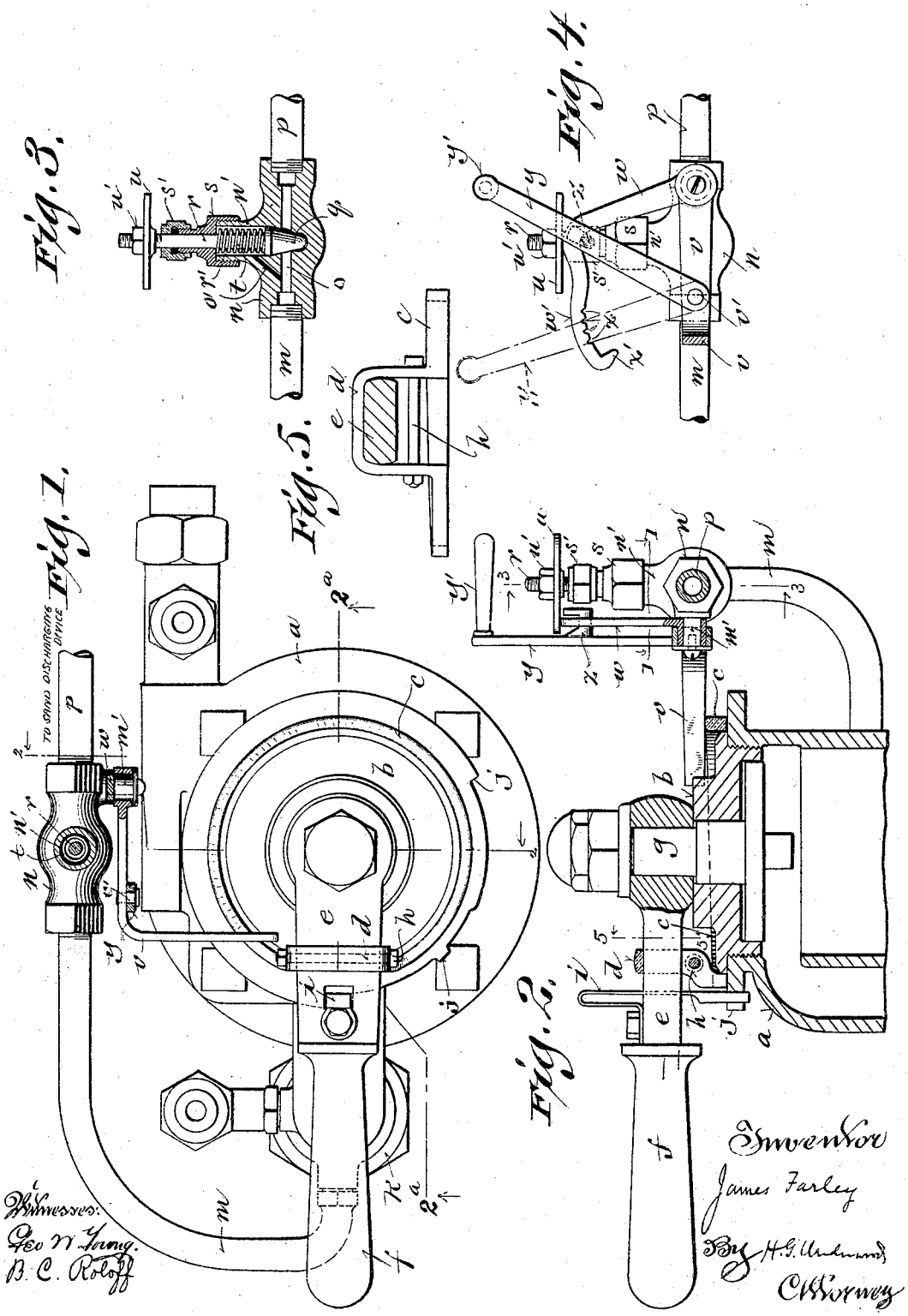

JAMES FARLEY, OF WAUKESHA, WISCONSIN.

COMPRESSED-AIR CONTROLLING DEVICE FOR SAND-DISCHARGERS.

SPECIFICATION forming part of Letters Patent No. 696,730, dated April 1, 1902.

Application filed September 13, 1901. Serial No. 75,258. (No model.)

*To all whom it may concern:*

Be it known that I, JAMES FARLEY, a citizen of the United States, and a resident of Waukesha, in the county of Waukesha and State of Wisconsin, have invented certain new and useful Improvements in Compressed-Air Controlling Devices for Sand-Dischargers; and I do hereby declare that the following is a full, clear, and exact description thereof.
My invention relates particularly to an attachment for use in admitting air to a sand-discharging device employed in connection with the engineer's brake-valve of a railway-locomotive; and it consists in certain peculiarities of construction and combination of parts, as will be fully set forth hereinafter in connection with the accompanying drawings and subsequently claimed.

In the said drawings, Figure 1 is a plan view of an engineer's brake-valve having attached thereto a device embodying my said invention, partly in section on the line 1 1 of Fig. 2, showing the parts in position with the air wholly cut off from the pipe leading to the sand-discharge device. Fig. 2 is a transverse vertical sectional view, taken on the line 2 2 of Fig. 1, with the brake-valve handle swung one-quarter around to admit air to the pipe leading to the sand-discharging device and with portions shown in section on the line 2ª 2ª of Fig. 1. Fig. 3 is a detail vertical sectional view of my valve-casing, taken on the line 3 3 of Fig. 1. Fig. 4 is a detail elevation of the valve-casing and the operating-levers and attachments comprising the essential parts of my said invention, and Fig. 5 is a detail sectional view on the line 5 5 of Fig. 2.

Referring to the drawings, *a* represents the

*[column 2]* shank ... and by means ... said bolt in the yoke-... the said handle-
shank ...
upper surface is formed on an inclined plane, as shown best in Figs. 2 and 5, for the purpose hereinafter described. The brake-valve
handle is provided with the usual spring *i*,
secured to and passing through a slot in the handle-shank for engagement with the lugs *j j j* on the valve-casing in the usual manner, this being old and well known in brake-valves
of this type, which latter are further connected with the main reservoir-pipe *k*. (Shown in Fig. 1.) In my invention a pipe *m* leads from this main pipe *k* to a valve-casing *n*, having a channel *o* therethrough, communi-
cating with another pipe *p*, which leads to
the sand-discharging device, which latter is not shown, and which may be of any ordinary or preferred construction, operated by compressed air. The channel *o* is closed by a
valve *q*, whose stem *r* extends vertically up
through the vertical passage *r'* in the upward extension *n'* of the valve-casing *n* and through a stuffing-box *s*, screwed to said extension of the casing, and through the suitably-packed
nut *s'* of the stuffing-box, said valve-stem *r*
being surrounded by a spring *t*, within the vertical passage *r'* in the valve-casing extension ... 
... the vertical valve-passage *r'*, and the said valve-stem *r* is screw-threaded at its upper projecting end for the adjustable reception of a disk *u*, which when it has been screwed to the desired point is secured in place by a nut *u'*.

No. 696,731. Patented Apr. 1, 1902.
E. G. GASSEN.
SAFETY FAUCET AND WATER CONTROLLING CONNECTION.
(Application filed Dec. 9, 1901.)
(No Model.)
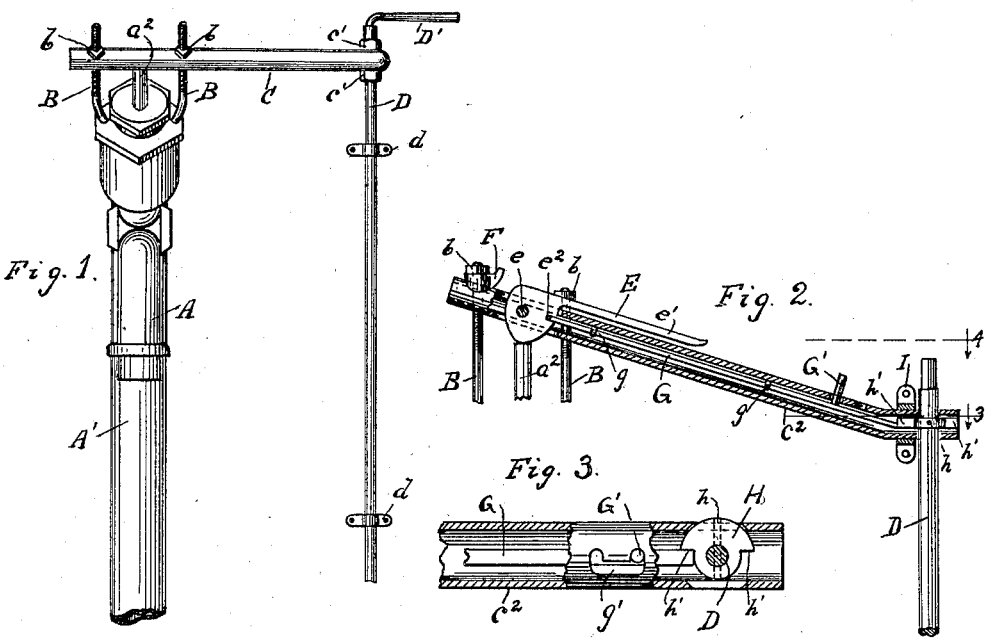
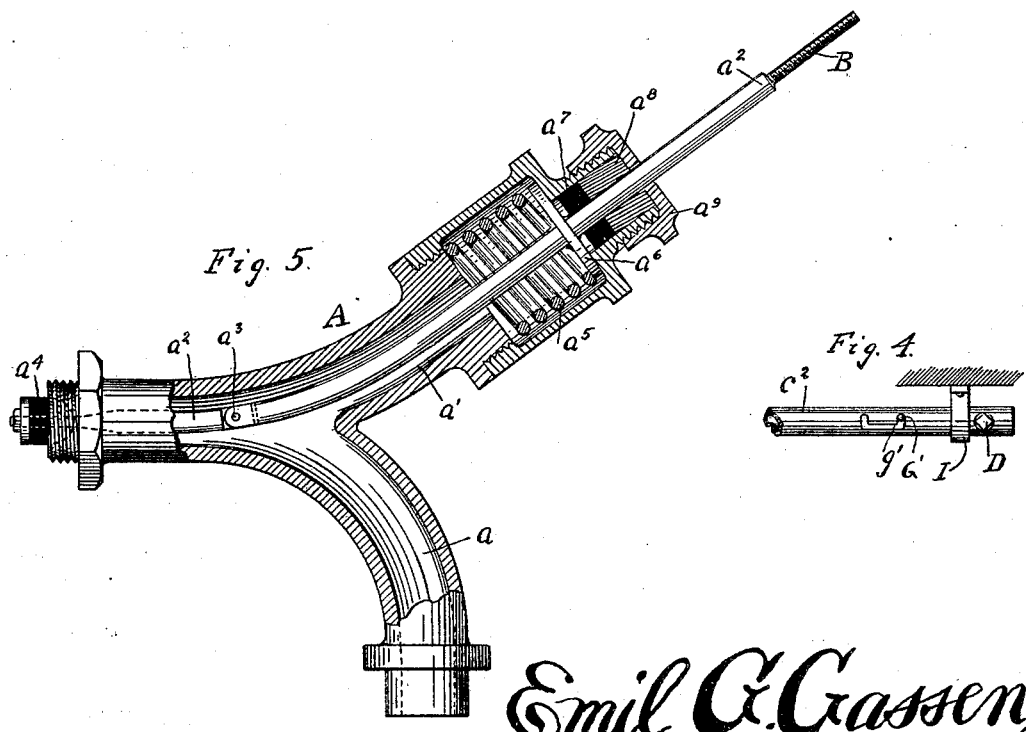

Pivotally secured on a stud *m'*, projecting